(12) United States Patent
Xiao

(10) Patent No.: US 11,590,863 B2
(45) Date of Patent: Feb. 28, 2023

(54) SEAT RECLINING MECHANISM WITH PROTECTIVE COVER

(71) Applicant: Jack Q. Xiao, North Bergen, NJ (US)

(72) Inventor: Jack Q. Xiao, North Bergen, NJ (US)

(73) Assignee: Creative Cedar Designs, Inc., Chattanooga, TN (US)

( * ) Notice: Subject to any disclaimer, the term of this patent is extended or adjusted under 35 U.S.C. 154(b) by 0 days.

(21) Appl. No.: 17/583,903

(22) Filed: Jan. 25, 2022

(65) Prior Publication Data

US 2022/0234479 A1   Jul. 28, 2022

Related U.S. Application Data

(60) Provisional application No. 63/141,632, filed on Jan. 26, 2021.

(51) Int. Cl.
  *B60N 2/22*   (2006.01)
  *B60N 2/23*   (2006.01)
  *B60N 2/235*  (2006.01)
  *B60N 2/58*   (2006.01)

(52) U.S. Cl.
  CPC  *B60N 2/22* (2013.01); *B60N 2/58* (2013.01)

(58) Field of Classification Search
  CPC ...... B60N 2/2252; B60N 2/2254; B60N 2/20; B60N 2/2213; B60N 2/22; B60N 2/1892
  See application file for complete search history.

(56) References Cited

U.S. PATENT DOCUMENTS

| | | | | |
|---|---|---|---|---|
| 4,781,416 A * | 11/1988 | Johnson | B60N 2/2252 475/176 |
| 5,634,689 A * | 6/1997 | Putsch | B60N 2/2252 475/162 |
| 5,692,589 A * | 12/1997 | Beguin | B60N 2/2227 192/39 |
| 7,090,298 B2 * | 8/2006 | Lange | B60N 2/2254 297/362 |
| 7,384,101 B2 * | 6/2008 | Kawashima | B60N 2/2254 297/362 |
| 7,878,593 B2 * | 2/2011 | Nae | B60N 2/2252 297/362 |
| 8,485,599 B2 * | 7/2013 | Thiel | B60N 2/20 297/216.13 |
| 8,833,858 B2 * | 9/2014 | Oki | B60N 2/2257 475/331 |
| 9,167,898 B2 * | 10/2015 | Wahls | B60N 2/6009 |
| 9,469,220 B2 * | 10/2016 | Nock | B23K 26/28 |
| 10,342,349 B2 * | 7/2019 | Veine | B60N 2/236 |
| 11,001,173 B2 * | 5/2021 | Spagnoli | B60N 2/2362 |
| 11,243,555 B2 * | 2/2022 | Arico | B60N 2/22 |
| 11,272,787 B2 * | 3/2022 | Nill | A47C 7/38 |

(Continued)

FOREIGN PATENT DOCUMENTS

CN  207241496 U  4/2018

*Primary Examiner* — Shin H Kim
(74) *Attorney, Agent, or Firm* — Miller & Martin PLLC; Stephen J. Stark

(57) ABSTRACT

A seat reclining mechanism has a protective device at the shell. The shell has an inner cover and an outer cover with a support plate set therein. The upper part of the shell has a gap for accommodating the rotation of an arm of a rotating plate extends out of the gap. A fence plate cooperates with the arm to keep the gap closed.

17 Claims, 2 Drawing Sheets

(56) References Cited

U.S. PATENT DOCUMENTS

| | | | |
|---|---|---|---|
| 2009/0315380 A1* | 12/2009 | Nae | B60N 2/2254 297/374 |
| 2011/0277574 A1* | 11/2011 | Mitsuhashi | B60N 2/2252 74/411.5 |
| 2012/0086254 A1* | 4/2012 | Schuler | F16H 1/32 475/180 |
| 2012/0205956 A1* | 8/2012 | Nock | B60N 2/20 297/362.11 |
| 2013/0134759 A1* | 5/2013 | Oki | B60N 2/1685 297/362 |
| 2013/0328342 A1* | 12/2013 | Okimura | B60N 2/22 297/354.12 |
| 2014/0001806 A1* | 1/2014 | Golarz | B60N 2/2252 297/362 |
| 2014/0097659 A1* | 4/2014 | Wahls | A47C 1/025 297/362 |
| 2014/0239693 A1* | 8/2014 | Nock | B23K 26/28 219/121.64 |
| 2015/0367758 A1* | 12/2015 | Chang | B60N 2/2252 297/361.1 |
| 2022/0234479 A1* | 7/2022 | Xiao | B60N 2/235 |

* cited by examiner

SEAT RECLINING MECHANISM WITH PROTECTIVE COVER

CLAIM OF PRIORITY

This patent application claims the benefit of U.S. Provisional Application No. 63/141,632 filed Jan. 26, 2021, which is incorporate herein by reference in its entirety.

FIELD OF THE INVENTION

The preferred embodiments relate to the technical field of automobile seats and, in particular, to a seat reclining mechanism with a protective device.

BACKGROUND OF THE INVENTION

A seat reclining mechanism is a part which is installed on the car seat to lock, unlock and adjust the angle of the back of the car seat. For the seat reclining mechanism with the current technology, as there is a need of rotation for the rotating plate, a gap is provided on the shell to accommodate rotation of the rotating plate. However, during the actual use process, the gap is easy to cause foreign matter fall into, so that the reclining mechanism function cannot be realized, or a finger may become stuck and cause injury.

Publication date Apr. 17, 2018, shows publication number CN207241496U for China patent documents having a car seat reclining mechanism device, including the lower connection plate, block, small gearing plate, large gearing plate, moving pieces, upper connecting plate, cover plate, connecting rod, lever, spring, torsion spring, main axis, and limit axis, the lower connecting plate is provided with an integrated arc upper convex, a front limit boss and a rear limit boss, the cover plate is provided with an integrated arc lower convex, and the lever is provided with an integrated lever boss. The seat reclining mechanism is provided with a front limit boss and a rear limit boss, so that the limit axis and their coordination control the range of adjustment angle, and because of the arrangement of upper arc convex and lower arc convex, so that the small gearing plate will not get stuck in motion.

However, this prior art seat reclining mechanism is provided with a gap on the shell to accommodate the rotation of the rotating plate. In the actual use process, the gap is easy to cause foreign matter fall into, so that the reclining mechanism function cannot be realized, or the finger becomes stuck and causes injury.

SUMMARY OF THE INVENTION

An object of many embodiments of the present invention is to solve the problem that a gap is provided on the seat reclining mechanism of current technology, the gap is otherwise easy to cause foreign matter fall into, so that the reclining mechanism function cannot be realized, or a finger becomes stuck and causes injury. It is provided as a seat reclining mechanism with a protective device, to attempt to prevent foreign matter to fall into or the finger become stuck and potentially cause injury, to avoid reclining mechanism stuck and unable to realize the adjust function or the finger becoming stuck or causing injury.

The technical solution adopted by many embodiments of the present invention to solve the above technical problems uses a seat reclining mechanism with a protective device, including shell. The shell has an inner cover and outer cover, provided with support plate in an internal cavity therein, a core part of reclining mechanism, a rotating plate and a tension spring set in turn on the support plate by a shaft group. The outside of the outer cover is provided with a lever.

The upper portion of the shell is provided with a gap to accommodate the rotation of the rotating plate from at least a first to a second position. The upper portion or arm of the rotating plate extends out of the gap, the position of the rotating plate near the gap is provided with a fence plate. The fence plate's width is bigger or wider than the width of the gap. The length of the fence plate with the support plate at the gap is bigger than the length of the gap, so that when the rotating plate moves through the gap, the fence plate rotates together with the rotating plate and keep the gap closed.

Rotation of the plate may be used to adjust seat angle. Because of the rotating plate need to transform perspective, the upper part of the shell is provided with a gap to accommodate the rotating plate rotation. The gap would otherwise potentially be easy to cause foreign matters fall into or the finger may become stuck and cause injury. To avoid reclining mechanism being stuck and unable to realize the adjust function or the finger become stuck and cause injury, many embodiments are provided with a fence plate near the position of the rotating plate, when the rotating plate rotates, the fence plate and the rotating plate rotate together. Because the width portions of the fence plate is bigger (wider) than the width of the gap, and the length of the fence plate opposite the rotating plate with the rotating plate at, the gap is bigger or larger than the length of the gap, no matter what position of the rotating plate is in the gap, the fence plate covers and closes the gap. Thus, the utility model solves the problem that the exposed gap on the seat reclining mechanism of the current technology, which is easy to cause foreign matter fall into, so that the reclining mechanism function cannot be realized, or the finger become stuck and be injured.

For many embodiments of the invention, the inner cover and upper surface of the outer cover provide a concentric circular arc surface to the shaft group and the width of the gap matches with the thickness of the rotating plate. The fence plate may cooperate with circular arc surface close to the top of shell of circular plate and the fence plate provided with the rotating plate in the middle of adaptation of mounting holes. The fence plate hole may be located on the rotating plate by the mounting hole sleeve. The upper surface of the shell (inner cover and outer cover) may be arranged as a circular arc surface, and the fence plate may provide a circular arc plate closely matched with the circular arc surface. These arcs may be concentric with the rotating shaft group, so that when the rotating plate rotates, the fence plate and the shell are closely matched, which can better prevent foreign matter from falling into the gap.

For many embodiments of the invention, the inner cover and the outer cover are provided with an arc plate, the distance between arc plate on the inner cover and outer cover is matched to cooperate with the thickness of the rotating plate, between the inner cover and the outer cover is provided with an arc groove, and the fence plate is disposed in the arc groove and sliding along the arc groove. The impact strength of the fence plate can be increased, and the rupture of the fence plate can be avoided when a heavier foreign matter impacts the fence plate, and the service life of the reclining mechanism can be extended.

For many embodiments, a gap angle corresponding from the shaft to both ends of the gap may be 110-120 degrees, and the fence plate angle corresponding to from the shaft to both ends of the fence plate may be 175-185 degrees. The fence plate angle corresponding to from the shaft to both ends of the arc plate may be bigger than the central angle corresponding to both ends of the fence plate. The fence plate angle is preferably larger than the gap angle to ensure that the fence plate closes gap through the range of motion of the rotating plate. The arc plate angle is preferably larger than the fence plate angle, and then the arc gap has enough length to meet the needs of the fence plate sliding.

For many embodiments, the rotating center of the rotating plate is provided with a shaft sleeve, one side of the shaft sleeve may be provided with an axial extension of the side groove, the inner end of the torsion spring may be embedded in the side groove. The outer edge of the supporting plate may be provided with a flanging. The flanging may be provided with a bayonet. The outer end of the torsion spring may be arranged in the bayonet on the side of the supporting plate. The torsion spring may provide the reset spring force for the rotation of the rotating plate.

For many embodiments, inner cover and the outer cover may be box-like structures with symmetrical appearance. The openings of the inner cover and the outer cover may be interlocked to form the shell. The inner cover is preferably provided with a convex strip along the outer edge of the opening. The opening outer edge of the shell may be provided with a groove corresponding to the convex strip, and the inner cover and the outer cover may be interlocked with the groove through the convex strip, which can increase the structural strength after the shell is formed.

For many embodiments, half of the gap may be arranged on the inside cover, the other half may be arranged on the outer cover, and the outside of the lever may be provided with a lever cover.

A beneficial effect of many embodiments is that it effectively solves the problem that current technical seat reclining mechanism is provided with an exposed gap, which is easy to cause foreign matter falling into and the reclining mechanism is stuck and cannot realize the adjustment function, or the finger is stuck causing injury. The seat reclining mechanism of many embodiments can prevent foreign matter from falling into or fingers jammed and avoids the reclining mechanism from jamming or user injury and has high practical value.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE PREFERRED EMBODIMENT

Figure 1:
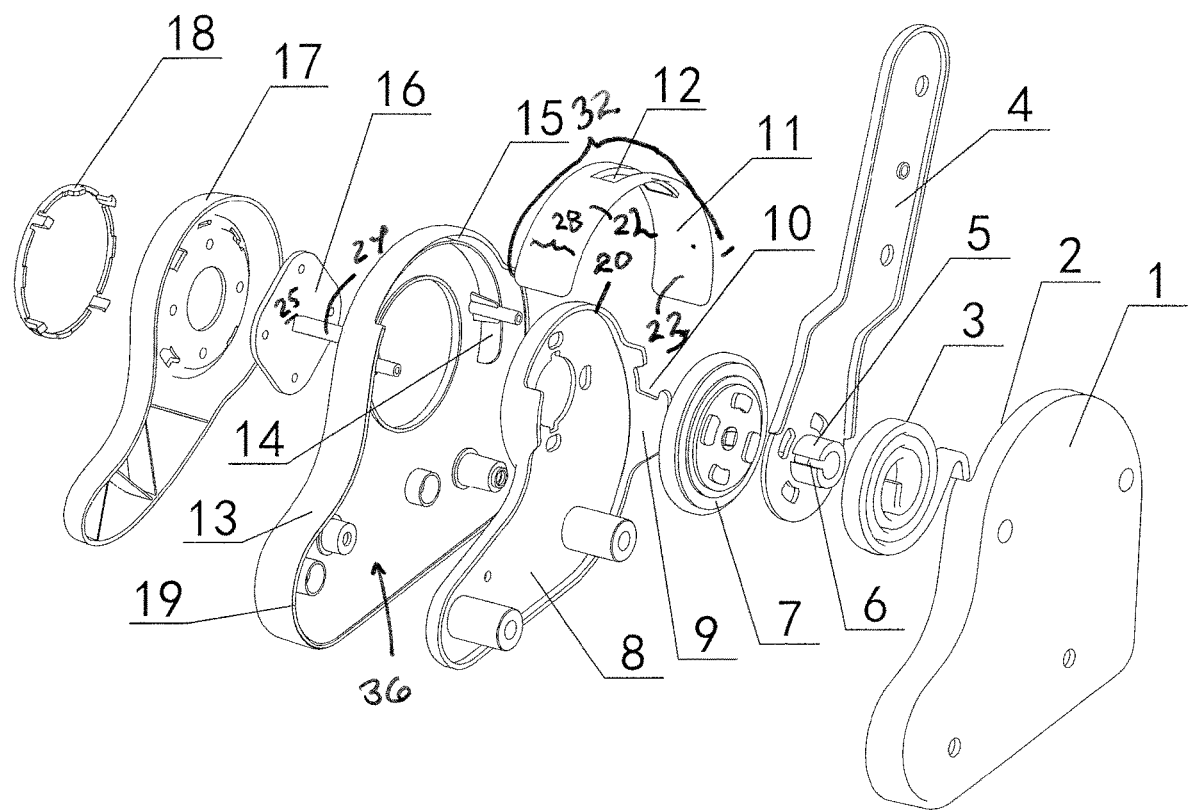
FIG. 1 is an exploded view of the seat reclining mechanism of the present invention.

The specific implementation of the technical solution of the preferred embodiments of the present utility model will be further explained below by the examples and the accompanying pictures.

In the figures: Inner cover 1, Gap 2, Torsion spring 3, Rotating plate 4, Bushing 5, Side groove 6, Core part 7, Support plate 8, Flanging 9, Bayonet 10, Fence plate 11, Mounting hole 12, Outer cover 13, Arc plate 14, Arc groove 15, Shaft group 16, Lever 17, Lever cover 18, Convex strip 19, Support plate slot 20, shell 21, First portion 22, Second portion 23, Shaft 24, Base 25, Arm 26, Reclining mechanism 27, Width 28, Width 29, First portion 30, Second portion 31, Edge 32, Length 33, First edge 34, Second edge 35, Internal Cavity 36.

Figure 2:
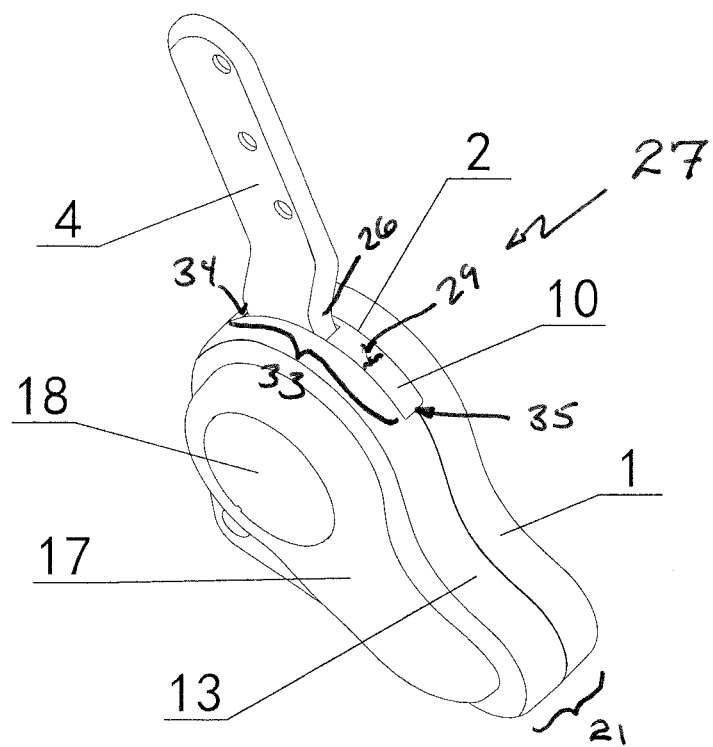
FIG. 2 is a perspective view of the seat reclining mechanism of FIG. 1 in a first position.
Figure 3:
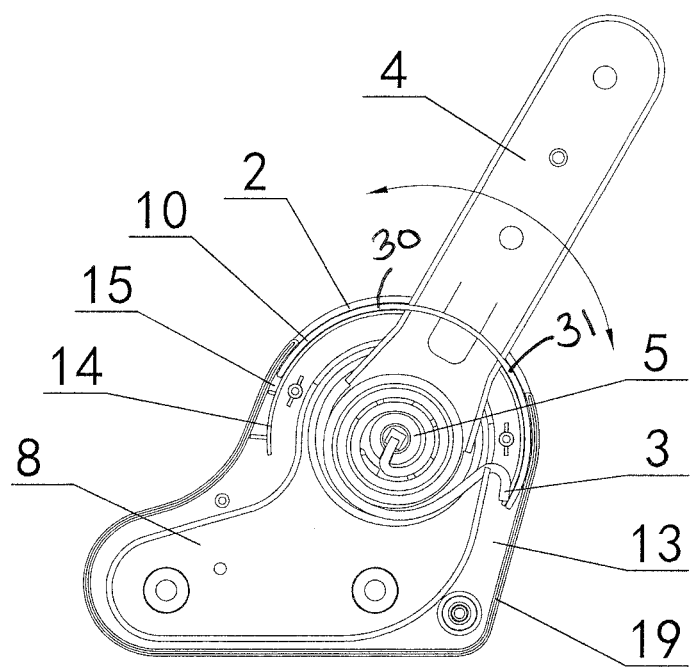
FIG. 3 is a plan cut away view of the embodiment of FIGS. 1-2.

As shown in FIG. 1 and FIG. 2 for example 1, a reclining mechanism 22 is provided with a protective device having a shell 21, which is composed of an inner cover 1 and an outer cover 13. The inner cover 1 and the outer cover 13 form a box-shaped structure forming an internal cavity 36 therein, possibly with the inner and outer covers 1,13 having a symmetrical appearance. The inner cover 1 and the outer cover 13 are buckled or otherwise connected together to form the shell 21. The inner cover 1 may be provided with a convex strip 19 along the outer edge of the opening. The outer edge of the opening of the outer cover 13 may be provided with a groove (obscured from view) corresponding to receive the convex strip 19. The inner cover 1 and the outer cover 13 may be connected with each other at the convex strip 19 and the groove.

The shell 21 is provided with a support plate 8 internal thereto. The core part 7, the rotating plate 4, and the torsion spring 3 of the reclining mechanism 27 are set on or supported by the support plate 8 in turn through use of the shaft 24 of the rotating shaft group 16. The rotation center or axis of the rotating plate 4 at the shaft 24 may be provided with a shaft sleeve 5. At one side of the shaft sleeve 5 may be an axially extending side groove 6. The inner end of the torsion spring 3 may be embedded in the side groove 6. The outer edge of the support plate 8 may be provided with a flange 9 and a bayonet 10 may be provided on the flange 9. The outer end of the spring or torsion spring 3 may be set in the bayonet 10 on one side of the support plate 8. A lever 17 may be provided on an outer side of the outer cover 13, and a lever cover 18 may be provided on the outer side of the lever 17.

The upper part of the shell 21 is provided with a gap 2 for accommodating the rotation of an arm 26 of the rotating plate 4. Half or other portion of the gap 2 may be defined by the inner cover, and the other half (or other portion) of the gap 2 defined in the outer cover 13. The upper end or arm 26 of the rotating plate 41 reaches out of the gap 2. The position of the rotating plate 4 or arm 26 near or at the gap 2 is provided with a fence plate 11. A width 28 of the fence plate 11 is bigger or wider than the width 29 of the gap 2. A length of first and/or second portions 30,31 the fence plate 11 together with the arm 26 where it passes through by the fence place 11 is longer than the length 33 of the gap 2. When the rotating plate 4 rotates, the fence plate 11 and the rotating plate 4 rotate together keep the gap 2 closed. When the arm 26 is moved between first position (shown in FIG. 2) to second position from first to second edges 34,35 of the gap 2 for at least some embodiments. First portion 30 of the fence plate 11 is on one side of mounting hole 12, second portion 21 on the other side.

In this example, at upper end portions of the inner cover 1 and the outer cover 13 are arc surfaces or arc plates 14 concentrically disposed with the rotating shaft 24. The width of the gap 2 matches or cooperates with the width of the arm 24 of the rotating plate 4. The fence plate 11 is preferably between the arc plate 14 at the upper end of the shell 21. The arc plate 14 and the fence plate 11 are provided with a mounting hole 12 adapted to receive the arm 26 of the rotating plate, and the fence plate 11 is sleeved on or others the rotating plate 4 through the mounting hole 12. Both the inner cover 1 and the upper part of the outer cover 13 are provided with an arc-shaped plate 14. The distance between the arc plate 14 on the inner cover 1 and the arc plate 14 on the outer cover 13 cooperate with the thickness of the rotating plate 11 to permit the arm 26 to move between first and second positions in the gap 2. An arc-shaped groove 15 is formed between the inner sides of the upper end surface of the inner and outer covers 1,13 and the arc plates 14. The fence plate 11 slides in the arc-shaped or arc groove 15.

In this example, a gap angle from the shaft 24 to the two ends of the gap 2 is 116 degrees. A fence plate angle from the shaft 24 to the two ends of the fence plate 11 is 180 degrees, and an arc plate angle from the shaft 24 to the two ends of the arc plate 14 is bigger than the fence plate angle.

The preferred embodiment is provided with a fence plate 11 at a first position of the rotating plate 4 close to the gap 2 or a first edge 32 of the gap 2. When the rotating plate 4 rotates, the fence plate 11 and the rotating plate 4 rotate together. Since the width 28 of the fence plate 11 is wider than the width 24 of the gap 2 and the length 32 of the first and second positions 30,31 of the fence plate 11 is longer than the length 33 of the gap 2, regardless of the position of the rotating plate in the gap 2, the fence plate 11 covers and closes the gap 2 such as by rotation (or other movement) to the second position with the arm 26 against (or closer to) the second edge 35. In this way, the embodiment solves the problem that the seat reclining mechanism in the current technology which is provided with an exposed gap 2. This may easily cause foreign matter to fall into the reclining mechanism, making the reclining mechanism jam and cannot realize the adjustment function, or causes a finger to jam and cause injury.

Except for the above-mentioned example, within the scope disclosed in the claims and specification of the utility model, the technical features or technical data of the utility model can be re-selected and combined to form a new example. These are all technologies in the field. It can be achieved by personnel without creative work. Therefore, these examples of the present utility model that are not described in detail should also be regarded as specific examples of the present utility model and within the protection scope of the present utility model.

What is claimed is:

1. A seat reclining mechanism comprising:
a shell having an inner shell and an outer cover providing a gap at an upper portion of the shell into an internal cavity, the gap having a length and a width;
a rotating plate having an arm extending from the internal cavity in the shell through the gap and movable through a plane of motion within the gap from at least a first position to a second position;
a spring at least selectively applying a bias to the rotating plate; and
a fence plate operably coupled to the shell and the arm at the gap, the fence plate moving with the arm between the first and second positions, with the fence plate and arm as a combination extending across both the length of the gap in the first and second positions, and the fence plate extending wider than the width of the gap.

2. The seat reclining mechanism of claim 1 further comprising an arc groove disposed between the upper portion of the shell and an arc plate internally disposed relative to the inner and outer covers, said fence plate moving within the arc groove between the first and second positions.

3. The seat reclining mechanism of claim 1 wherein the spring is a torsion spring having an end connected to a support plate located in the internal cavity of the shell.

4. The seat reclining mechanism of claim 3 wherein the support plate has a support plate slot, the arm moves through the support plate slot between the first and second position, and the fence plate is located between the gap and the support plate slot.

5. The seat reclining mechanism of claim 4 wherein the support plate has a bayonet and the bayonet receives an end of the torsion spring.

6. The seat reclining mechanism of claim 4 wherein the support plate is secured between the inner and outer cover.

7. The seat reclining mechanism of claim 4 further comprising a shaft, and the shaft moves with arm from the first to the second position.

8. The seat reclining mechanism of claim 7 wherein the shaft extends through outer cover to connect with a lever.

9. The seat reclining mechanism of claim of 8 wherein the lever overcomes bias of the spring to permit movement of the arm.

10. The seat reclining mechanism of claim 9 wherein the shaft extends cantileveredly from a base, with the base connected to the lever.

11. The seat reclining mechanism of claim 10 wherein the shaft connects to the rotating plate and an opposite end of the torsion spring connects to the rotating plate.

12. The seat reclining mechanism of claim 2 wherein the fence plate has first and second portions opposite the arm, and the first portion of the fence plate and the arm have a longer length than the gap when in the first position, and the second portion of the fence plate and the arm have a longer length than the gap when in the second position.

13. The seat reclining mechanism of claim 11 wherein the fence plate has a mounting hole which receives the arm therethrough with the first and second portions of the fence plate located on opposite sides of the mounting hole.

14. The seat reclining mechanism of claim 8 wherein a gap angle between edges of the gap and the shaft is in a range of 110 to 120 degrees.

15. The seat reclining mechanism of claim 14 wherein a fence angle between ends of the fence plate and the shaft is in a range of 175 to 185 degrees.

16. The seat reclining mechanism of claim 15 wherein an arc angle between ends of the arc plate and the shaft is greater than the fence angle.

17. The seat reclining mechanism of claim 8 wherein the rotating support has a bushing having a side groove and the opposite end of the torsion spring is received in the side groove.

* * * * *